United States Patent [19]

Bendayan et al.

[11] 4,302,073
[45] Nov. 24, 1981

[54] OPTICAL FIBRE WITH A PROTECTIVE COVERING

[75] Inventors: Jacques Bendayan; Robert Jocteur, both of Lyons, France

[73] Assignee: Les Cables de Lyon S.A., Lyons, France

[21] Appl. No.: 37,484

[22] Filed: May 9, 1979

Related U.S. Application Data

[63] Continuation-in-part of Ser. No. 854,743, Nov. 25, 1977, abandoned, which is a continuation of Ser. No. 718,199, Aug. 26, 1976, abandoned.

[30] Foreign Application Priority Data

Sep. 19, 1975 [FR] France .................. 75 28807

[51] Int. Cl.³ ............................................. G02B 5/172
[52] U.S. Cl. .............................. 350/96.23; 350/96.30; 425/378 R
[58] Field of Search ................ 350/96.23, 96.30, 320; 174/70 R; 264/1, 174, 176 F, DIG. 41; 425/378 R, 381, 381.2

[56] References Cited

U.S. PATENT DOCUMENTS

| | | | |
|---|---|---|---|
| 3,227,786 | 1/1966 | Cohen | 264/174 X |
| 3,608,138 | 9/1971 | Marcovitch | 425/378 |
| 3,742,107 | 6/1973 | Hawkins | 264/174 |
| 4,116,654 | 9/1978 | Trehu | 264/1 X |
| 4,148,560 | 4/1979 | Margolis | 350/96.23 |
| 4,154,783 | 5/1979 | Jackson | 264/1 |
| 4,172,106 | 10/1979 | Lewis | 264/1 |

FOREIGN PATENT DOCUMENTS

| | | | |
|---|---|---|---|
| 2505621 | 8/1975 | Fed. Rep. of Germany | 350/96.23 |
| 2456069 | 5/1976 | Fed. Rep. of Germany | 350/96.23 |
| 1486227 | 9/1977 | United Kingdom | 350/96.23 |

*Primary Examiner*—John D. Lee
*Attorney, Agent, or Firm*—Haseltine and Lake

[57] ABSTRACT

The present invention relates to optical fibres with a protective covering for use in cables. The fibre is protected by a covering of plastic material extruded from an extruder the punch of which protrudes 0.5 to 1 mm beyond the draw plate, and rapidly cooled at the outlet of the draw plate, so that it surrounds the optical fibre with a clearance between 1 and 10 microns.

4 Claims, 1 Drawing Figure

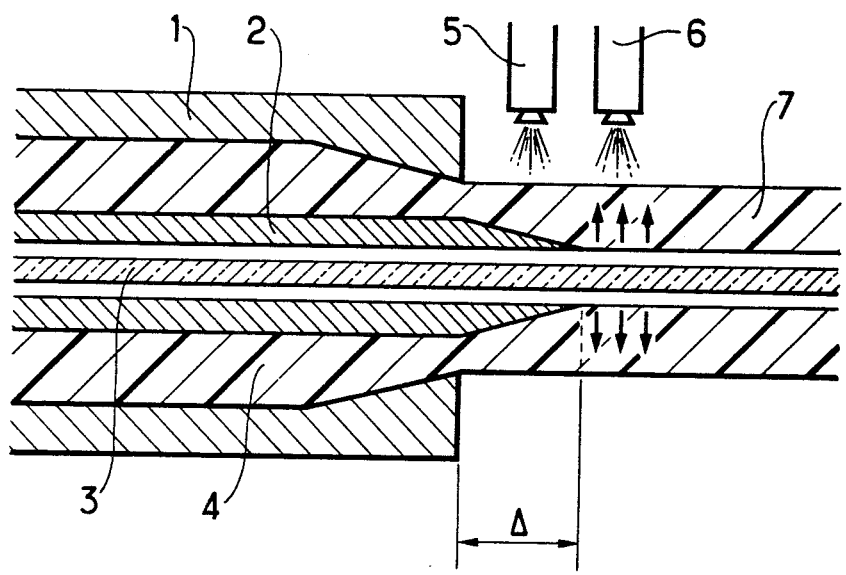

OPTICAL FIBRE WITH A PROTECTIVE COVERING

CROSS REFERENCE TO RELATED APPLICATIONS

This application is a continuation-in-part of Ser. No. 854,743 filed Nov. 25, 1977 which is a Continuation of Ser. No. 718,199 filed Aug. 26, 1976, both now abandoned.

FIELD OF THE INVENTION

The present invention relates to an optical fibre with a protective covering in a form suitable for making cables, and to a method for its manufacture.

BACKGROUND OF THE INVENTION

An optical fibre generally comprises a silica core clad with a layer of silica or plastic cladding of lower refractive index than the refractive index of said core, so that light propagating in the core is inhibited from entering into the cladding from the core. The cladding acts as an optical isolator allowing the fibre to be fitted with a mechanical covering without loss of light from the fibre.

A mechanical covering is provided to suppress or reduce the following hazards:

Abrasion which can cause microfractures in the surface material of the optical fibre, making the fibre mechanically fragile and increasing its transmission losses;

Corrosion which can likewise cause microfractures having the same detrimental effects as abrasion;

Mechanical stress, both longitudinal and transversal, which can result in microcurving and microbreaking of the fibre during cable manufacture, lessening both the mechanical and the transmission performance of the fibre.

Mechanical coverings intended to protect optical fibres from such hazards have been made by extrusion of various plastic materials. Such extrusion processes have tended to lessen the properties of optical fibres by subjecting them to mechanical stress, thermal stress... A typical extrusion method surrounds an optical fibre with a plastic covering in an extruder in the general form of a tubing die, i.e. having a drawplate concentric with a punch allowing the optical fibre to pass therethrough. A screw drives previously heated and molten plastic material through the annular gap between the punch and the drawplate to form the covering surrounding the fibre as it cools and solidifies.

Two such coverings are known:

The first covering is a tight fit on the fiber. It is made by using a so-called "pressure" extruder in which the punch is wholly inside of the drawplate, allowing the extruded plastic material to come into contact with the optical fibre while still in the molten state and under high pressure. Such a process is disclosed for instance in U.S. Pat. No. 3,742,107 to Hawkins. It has the disadvantage of causing microbreakings in the fibre which seem to be due to the high lateral pressure to which it is submitted during the extrusion.

The other covering is very loose. The radial clearance between the fibre and the covering can be as much as 70 microns for a fibre of a diameter of 125 microns.

Such a covering is made with a so-called "tube" extruder in which the drawplate and the punch are extended by concentric tubular "calibrating" parts and the calibrating part of the punch extends at least about 2 mm futher than the calibrating part of the drawplate. In this arrangement the fibre is not subjected to high lateral pressure by the extruded material of the covering. However, optical fibres provided with such loose coverings suffer increased transmission losses due in particular, to microcurves facilitated by the large radial clearance and differential expansion and contraction of the fibre and the covering.

It is an object of the invention to provide optical fibres with protective coverings wherein the fibre is less subject to microbending and microbreaking, and therefore of reduced transmission losses, while still mechanically protected to the same extent.

SUMMARY OF THE INVENTION

The optical fibre according to the invention has a protective covering of a plastic material extruded around the fibre with a radial clearance between the fibre and the covering substantially between 1 and 10 microns, obtained by extruding the plastic material in an extruder with a punch and a draw plate provided with calibrating parts, wherein the calibrating part of the punch extends further than the calibrating part of the draw plate by about 0.5 to 1 mm, and by submitting the extruded plastic material to a very quick cooling and thereby to a very quick centrifugal shrinkage.

Such an arrangement of the punch and the draw plate is called an intermediate arrangement.

A clearance between the optical fiber and the covering of 1 to 10 microns makes it possible both to avoid creating microfractures in the optical fibre during extrusion since the fibre is not subjected to lateral pressure, and to improve the behavior of the fiber during mechanical or thermal stresses; in particular, under thermal stress, the increase in transmission loss per kilometer and per d°C improves from 0.1 dB with a loose covering to 0.004 dB with a covering according to the invention, for a rated transmission loss of the fibre of 5 dB/km for a wavelength of 820 nm.

For the extrusion operation according to the invention, it is advantageous to use an extrudable plastic material which passes very quickly from the liquid state to the solid state on cooling. Polyamides such as Nylon or polyesters, preferably polyethylene terephthalate, are suitable materials for instance.

BRIEF DESCRIPTION OF THE DRAWING

The FIGURE shows an extrusion operation of the intermediate kind, providing a clearance of between 1 and 10 microns between the optical fibre and the covering.

DETAILED DESCRIPTION

In the FIGURE, the extruder comprises a draw plate (not shown) with a calibrating part 1, and a punch (not shown) with a calibrating part 2. The calibrating part of the punch extends to a distance Δ of 0.5 to 1 mm further than that of the draw plate. The optical fibre 3 is fed through the die, and molten plastic material 4, for instance Nylon, is fed through the draw plate around the die. Right around the outlet of the draw plate are injection nozzles of cold water such as 5 and 6. As soon as the plastic material is sprayed by streams of cold water, its outer surface solidifies and the inner zones of plastic material tend to shrink towards the outer surface as they cool, as shown by the arrows, so that there remains a gap of substantially 1 to 10 microns between the optical fibre and the covering 7 made with the solidified plastic material, but for some pinpoint contacts which occur at spaced locations.

The radial clearance between the fibre and the covering is sufficient to allow an easy withdrawal of the covering when one wants to get access to the ends of the fibre for connecting or joining operations.

What we claim is:

1. An optical fiber comprising: a silica core covered with a silica cladding of a refractive index lower enough than the refractive index of said core to inhibit light from entering said cladding from said core; said optical fibre having a mechanical protective covering of a plastic material passing rapidly from liquid state to solid state, being obtained by extrusion through a draw plate around a punch through which the optical fibre is passed; said draw plate and punch having calibrating parts, with the calibrating part of the punch protruding beyond the calibrating part of the draw plate about 0.5 mm to 1 mm; and the extruded plastic material having been submitted at the outlet of the calibrating part of the draw plate to a very rapid cooling and thereby to centrifugal shrinkage, whereby a substantial radial clearance is formed between the silica cladding and the covering of between 1 and 10 microns, but for pin-point contacts at spaced locations between said cladding and said covering.

2. An optical fibre according to claim 1, wherein the plastic material of the covering is a polyamide.

3. An optical fibre according to claim 1, wherein the plastic material of the covering is a polyester.

4. An optical fibre according to claim 3, wherein the polyester is polyethylene terephthalate.

* * * * *